United States Patent [19]

Khan

[11] Patent Number: 4,524,197

[45] Date of Patent: Jun. 18, 1985

[54] PROCESS FOR MAKING VINYLIDENE FLUORIDE CONTAINING FLUOROELASTOMERS

[75] Inventor: Ausat A. Khan, Newark, Del.

[73] Assignee: E. I. Du Pont de Nemours and Company, Wilmington, Del.

[21] Appl. No.: 645,095

[22] Filed: Aug. 28, 1984

[51] Int. Cl.$^3$ .......................... C08F 2/00; C08F 14/18
[52] U.S. Cl. ..................... 526/206; 524/545; 524/546; 526/84; 526/212; 526/216; 526/236; 526/254; 526/255; 528/489; 528/490
[58] Field of Search ................ 526/84, 206, 212, 216, 526/236, 254, 255; 528/489, 490

[56] References Cited

U.S. PATENT DOCUMENTS 3,707,529 12/1972 Gladding et al. ................ 260/80.77
3,839,305 10/1974 Moore ............................. 260/80.77
4,025,709  7/1977 Blaise et al. ........................ 526/225
4,360,652 11/1982 Dohany ............................. 526/210
4,381,384  4/1983 Khan ................................. 526/206

Primary Examiner—Harry Wong, Jr.

[57] ABSTRACT

Making a fluoroelastomer by feeding to an aqueous polymerization medium in a reactor about 25–75% by weight of the total monomers, vinylidene fluoride, at least one other fluorine-containing ethylenically unsaturated monomer containing at least as many fluorine atoms as carbon atoms and copolymerizable with vinylidene fluoride, an inorganic free-radical initiator, a chain transfer agent added in an amount sufficient to maintain a concentration in the aqueous polymerization medium of from about $0.5 \times 10^{-3}$ to $5 \times 10^{-3}$ moles per 100 grams of total monomers, and from about 0.02–2% by weight, based on the weight of the aqueous medium, of a surfactant which is a compound having the formula:

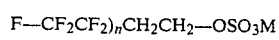

$$F-(CF_2CF_2)_n CH_2CH_2-OSO_3M$$

where n is an integer of from 2–8 or mixtures thereof and M is an alkali metal cation, hydrogen or ammonium, maintaining the pH of the aqueous polymerization medium within a range of from about 2.5–5, continuously removing a portion of the resulting fluoroelastomer latex from the polymerization reactor and adding to said portion a mineral acid or a carboxylic acid containing no more than 5 carbon atoms and having a pK of less than about 4.2 to lower the pH to about 2 or below and a water-soluble salt of an alkaline earth metal to coagulate the fluoroelastomer and recovering the fluoroelastomer from the latex.

12 Claims, No Drawings

PROCESS FOR MAKING VINYLIDENE FLUORIDE CONTAINING FLUOROELASTOMERS

BACKGROUND OF THE INVENTION

This invention relates to an improved process for making solid elastomeric copolymers of vinylidene fluoride and at least one other fluorine-containing monomer.

Elastomeric interpolymers of vinylidene fluoride and other copolymerizable fluorine-containing monomers, such as hexafluoropropene and/or tetrafluoroethylene, optionally containing small amounts of other fluorine-containing monomers, are well known in the art and have an established place in commerce because of their excellent chemical and thermal stability.

These elastomers are generally prepared by the aqueous emulsion polymerization of fluoroolefin monomers in the presence of water-soluble free radical initiators (e.g., ammonium persulfate) with surfactants and chain transfer agents by either batch or continuous polymerization procedures. However, residual amounts of surfactants remaining in the fluoroelastomers have an adverse effect on the physical properties of the resulting fluoroelastomers due to the presence of acid end groups on the surfactant in the polymer. It is difficult to remove the surfactant from the fluoroelastomers, as contrasted to removing surfactants from fluoroplastics, because the fluoroelastomers cannot be heated to temperatures sufficiently high to remove the surfactant by volatilization without, at the same time, decomposing the fluoroelastomers. The present invention is directed to a process for removing substantially all of a particular group of surfactants from the fluoroelastomer while retaining the beneficial properties of the fluoroelastomer, such as a high compression set resistance, good stress-strain properties and low die swell. The present process results in a fluoroelastomer having few acid end groups. The presence of acid end groups detrimentally effects the processing characteristics of the fluoroelastomer since these groups increase the viscosity of the polymer and interfere with curing systems, especially those based on quaternary phosphonium salts.

SUMMARY OF THE INVENTION

The present invention is directed to a process for making a fluoroelastomer which comprises feeding to an aqueous polymerization medium in a reactor about 25–75% by weight of the total monomers, vinylidene fluoride, at least one other fluorine-containing ethylenically unsaturated monomer containing at least as many fluorine atoms as carbon atoms and copolymerizable with vinylidene fluoride, an inorganic free radical initiator, a chain transfer agent added in an amount sufficient to maintain a concentration in the aqueous polymerization medium of from about $0.5 \times 10^{-3}$ to $5 \times 10^{-3}$ moles per 100 grams of total monomers, and from about 0.02–2.0% by weight, based on weight of the aqueous medium, of a surfactant which is a compound having the formula:

$$F\text{---}CF_2CF_2\text{---}_nCH_2CH_2\text{---}OSO_3M$$

where n is an integer from 2–8 or mixtures thereof and M is alkali metal cation, hydrogen or ammonium maintaining the pH of the aqueous polymerization medium within a range of from about 2.5–5, removing a portion of the resulting fluoroelastomer latex from the polymerization reactor and adding to said portion a mineral acid or a carboxylic acid containing no more than 5 carbon atoms and having a pK of less than about 4.2 to lower the pH to about 2 or below and a water-soluble salt of an alkaline earth metal to coagulate the fluoroelastomer and recovering the fluoroelastomer from the latex. This process results in substantially all the surfactant being removed from the fluoroelastomer which is the principal source of acid end groups in the polymer, while, at the same time, retaining valuable physical characteristics and properties of the polymer.

The process provides an improved fluoroelastomer having a polydispersity ($\overline{M}w/\overline{M}n$) in the range of about 2.2–3.5, a narrow particle size distribution where the average diameter of the particle size is less than about 0.5 micrometers ($\mu$m) and preferably within the range of 0.1–0.35 micrometers and a low acid end group concentration of the order of no more than about 3 meq/kg of polymer. The resulting polymer has low die swell, good processing characteristics and physical properties.

DETAILED DESCRIPTION OF THE INVENTION

A surfactant having the formula $F(CF_2\text{---}CF_2)_nCH_2\text{---}CH_2\text{---}OSO_3M$ that is employed in the reaction is most readily available as a mixture of compounds in which n is an integer from 2–8 or mixtures thereof. The average value of n is between 3–6, but 4 is most commonly available. The cation M is ammonium, hydrogen or an alkali metal, and most preferably is $NH_4^+$, $Na^+$, $Li^+$ or $K^+$ with ammonium being especially preferred because, among other things, it is more easily removed from the fluoroelastomer by the present process. The surfactants are present in the aqueous polymerization medium in amounts of from about 0.02–2% by weight, based on the weight of the aqueous medium, preferably from about 0.3–0.75% by weight. If more than about 2% by weight surfactant is used, no additional benefits are obtained and the fluoroelastomer becomes very foamy which makes degassing of the latex more difficult. If less than about 0.03% by weight surfactant is used, then the benefits are substantially reduced because such amounts are inadequate to control the particle size of the fluoroelastomer and molecular weight distribution becomes broader, and a higher acid end group concentration occurs in the elastomer.

Chain transfer agents are used in the process to produce non-ionic end groups in the fluoroelastomers. The amount of chain transfer agent used in an amount sufficient to maintain a concentration in the aqueous medium of from about $0.5 \times 10^{-3}$ to $5 \times 10^{-3}$ moles per 100 grams of total monomers, preferably and usually about $1.0\text{--}3.5 \times 10^{-3}$ mole per 100 grams of total monomer. Chain transfer agents used in the process of this invention are hydrocarbon alcohols, esters, halides, ketones and mercaptans containing 1–12 carbon atoms. Such chain transfer agents are described in, for example, U.S. Pat. Nos. 3,707,529 and 3,069,401, the disclosures of which are incorporated herein by reference. The efficiency of the chain transfer agent for a particular polymerization is highly dependent upon its partition coefficient among all three phases, i.e., aqueous phase, polymer particles, and monomer phase, and its effect on molecular weight distribution as discussed by Paul J. Flory in "Principles of Polymer Chemistry" on page 138, Cornell University Press, Ithaca, N.Y. (1953). In other words, the various chain transfer agents do not perform equally efficient in different polymerization systems, so that the amount of agent to be used cannot be specified exactly in a manner that will cover all cases. In general, the amount indicated above in the presence of a free-radical initiator will produce a fluoroelastomer having an inherent viscosity of from about 0.4–1.1 dl/g. Representative chain transfer agents include carbon tetrachloride, carbon tetrabromide, methylene iodide and methylene bromide, methyl ethyl ketone, esters of mono- or di-carboxylic acids, linear chain alcohols, such as methanol and propanol. Isopropanol is an especially preferred chain transfer agent because the addition of such alcohol to the process results in nontoxic by-products and it is inexpensive. Many chain transfer agents that are highly halogenated organic compounds, although effective, have the disadvantage of producing toxic by-products that must be removed. When isopropanol is used in the process, one adds a molar amount about equivalent to the moles of free-radical initiator used in the process. Diethyl malonate is a preferred, but less effective chain transfer agent than isopropanol, and can be added in an amount about three times the molar amount of the free radical initiator to produce a similar effect. Routine experimentation can determine the exact amount of chain transfer agent for a particular system.

The fluoroelastomers used in this invention in addition to containing vinylidene fluoride contain at least one other fluorine-containing ethylenically unsaturated monomer containing at least as many fluorine atoms as carbon atoms and copolymerizable with vinylidene fluoride in the aqueous dispersion process. Representative ethylenically unsaturated fluorine-containing monomers that can be used in the process include trifluoropropene, pentafluoropropene, hexafluorobutene, octafluorobutene, and hexafluoropropene which is especially preferred because of the characteristics of the resulting elastomer when hexafluoropropene intercepts the crystallinity of the polymer. The fluoroelastomers can also contain the fluorine-containing monomers trifluoroethylene, tetrafluoroethylene and chlorotrifluoroethylene. Fluorinated olefins with one or more chlorine and/or bromine substituents can also be used. Perfluoroalkyl perfluorovinyl ethers, such as perfluoromethyl perfluorovinyl ethers, are monomers that can be used in the process of this invention.

Both tetrafluoroethylene and hexafluoropropene are used in making several preferred fluoroelastomers of this invention. One such preferred fluoroelastomer comprises adding to the aqueous emulsion about 25–75%, by weight of the total monomers, vinylidene fluoride, and 25–75% by weight hexafluoropropene. The resulting fluoroelastomer exhibits exceptional elastomeric properties, thermal stability, and resistance to chemical degradation. Another preferred fluoroelastomer is prepared by adding to the aqueous emulsion 25–70% by weight vinylidene fluoride, 19–60% by weight hexafluoropropene and 3–35% by weight, preferably 15–25% by weight, tetrafluoroethylene. The resulting fluoroelastomer exhibits good elastomeric properties and thermal stability.

Any conventional inorganic free-radical initiator used in fluoroelastomer polymerization can be used in the process of this invention. Water-soluble inorganic peroxidic substances known to the prior art, such as sodium, potassium, or ammonium persulfates, perphosphates, perborates, percarbonates or permanganates are especially useful. The free radical initiators can be further activated by reducing agents such as sodium, potassium, or ammonium sulfite, bisulfite, metabisulfite, hyposulfite, thiosulfate, phosphite, or hypophosphite or by easily oxidized metal compounds such as ferrous, cuprous, and silver salts. The preferred free radical initiator is ammonium persulfate, and it is particularly preferred for use in a redox system with sodium bisulfite. The acid end groups concentration depends on the type and amount of initiator employed in the process as well as the surfactant and the level of chain transfer agent.

The aqueous emulsion polymerization of vinylidene fluoride with a fluorine-containing ethylenically unsaturated monomer, e.g., hexafluoropropene, in the presence of ammonium persulfates produces acid end groups, which are $R_fCF_2COOH$, $R_fCF_2OSO_3H$, $R_fCH_2OSO_3H$, where $R_f$ is a fluorinated alkyl group usually containing up to about 15 carbon atoms, referred to as strong acids, and $CH_2COOH$, referred to as a weak acid end group. A dye partition method, which is described by S. R. Palit et al, J. Poly. Sci., A-2, 4433, 4441 (1964), is used for the determination of strong acid end group concentration. It is the strong acid end groups that are referred to in this specification as acid end groups.

The pH of the aqueous polymerization medium is maintained within a range of from about 2.5–5 by any conventional method. A particularly suitable means for controlling the pH is to continuously add to the fluoroelastomer latex an alkaline buffer, such as sodium hydrogen phosphate, sodium hydroxide, potassium hydroxide, ammonium hydroxide or carbonates and phosphate salts of alkaline compounds in sufficient amounts to maintain the pH within the desired range.

A portion of the resulting fluoroelastomer latex is continuously removed from the polymerization reactor to which is added a mineral acid, such as nitric, sulfuric, hydrochloric, phosphoric, or a carboxylic acid containing no more than five carbon atoms and having a pK of less than 4.2, such as formic acid or trifluoroacetic acid, to lower the pH to about 2 or below. Although the lower limit is not material, usually it is not less than 0. The addition of a mineral acid is preferred, especially nitric acid because it increases the cation solubility.

The fluoroelastomer latex is coagulated by adding to the latex, usually having a pH of about 2 or less, a water-soluble salt of an alkaline earth metal in sufficient amount to coagulate the latex, usually from about 1–6 grams per liter of latex. Representative water-soluble salts include, calcium and magnesium salts of nitrates, chlorites and acetates. The order of addition of the mineral acid and/or carboxylic acid and the alkaline earth metal salt to the fluoroelastomer latex is not critical. The ingredients can be added simultaneously or in any sequence. However, it is preferred to add the mineral acid or carboxylic acid to the fluoroelastomer latex first to adjust the pH and then subsequently add the alkaline earth metal salt to coagulate the fluoroelastomer latex.

After the fluoroelastomer latex is coagulated and isolated, preferably by filtration, it is washed one or two times with water, using about the same volume of water as volume of fluoroelastomer latex washed. Although the temperature of the water is not a critical factor, washing efficiency is improved if the water temperature is heated to about 40°–50° C. Washing also removes small amounts of buffer, surfactant and alkaline earth metal salts that are present in the fluoroelastomer latex.

The fluoroelastomer latex is subsequently dried usually in the form of crumb, at a temperature of about 70°-200° C., usually by circulating hot air over the crumb or in an oven.

The molecular weight distribution of the fluoroelastomer copolymers described herein was determined by gel permeation chromatography (GPC), "Water Associates, Model 200." The inherent viscosity was determined at 30° C., at a concentration of 0.1% by weight of polymer in a mixed solvent of 86.1% by weight tetrahydrofuran and 13.9% by weight dimethylformamide. Mooney viscosity was determined according to ASTM Method D-1646. The latex particle size was determined by laser light scattering as described by B. Chu, Laser Light Scattering, 1974 Academic Press, New York, N.Y.

The processing characteristics were measured by Monsanto Processability Tester (MPT) described by E. Rodger, R. Barker and G. Hanna, Processability, Key to Process Control, Rubber Chem. Technol., 50, 1 (1976), which includes a constant rate capillary rheometer with laser die swell and stress relaxation capability.

The molecular weight distribution of the polymer is affected by the amount of free radical initiator, chain transfer agent, and overall conversion of monomers. In other words, overall monomer conversion will affect the molecular weight distribution of the polymer. It has been an objective of the rubber producers to increase the monomer conversion without affecting the processing characteristics of the polymer having the same molecular weight because this reduces the cost of manufacturing. The polydispersity ($\overline{M}w/\overline{M}n$) of the polymer will change due to high conversion, and therefore, it may affect the processing characteristics.

The examples illustrated below are made by the following procedure. Vinylidene fluoride and hexafluoropropene are metered continuously, at the rates given in the examples, through rotameters and fed to a diaphragm compressor, which discharges the monomers continuously at the desired pressure and temperature into a two-liter autoclave reactor. Initiator, surfactant, chain transfer agent, and buffer are mixed with deoxygenated water and continuously pumped into the autoclave by separate lines at the rates shown in the examples. The reaction mixture in the autoclave is maintained at a pH between 2.5-5 by the buffer and the autoclave is maintained liquid full and at a temperature of 50°-130° C. by controlling the jacket temperature. A portion of the fluoroelastomer latex and unreacted monomer are removed at the top of the autoclave through a pressure reduction valve into a degasser where the unreacted monomer is separated from the fluoroelastomer latex and passed through a wet test meter and gas chromatograph for determining the gaseous monomer conversion and composition of the fluoroelastomer.

The fluoroelastomer latex is acidified with 10 ml of 70% nitric acid per gallon of latex to a pH of 2 or below. An aqueous solution of 15% calcium nitrate is added in the amounts of 80-140 ml/liter of latex to coagulate the fluoroelastomer. The fluoroelastomer is washed with distilled water several times in agitated tanks, and oven dried.

The surfactants used in the present process are prepared by dissolving under nitrogen the corresponding alcohol in trichlorotrifluoroethane to form about a 10% solution. An equal molar amount of chlorosulfonic acid based on the alcohol is added at room temperature and hydrogen chloride is evolved. The mixture is stirred for about two hours until the evolution of hydrogen chloride ceases. Ammonia gas is bubbled through a dip tube to precipitate the salt of the surfactant. The salt is filtered, washed with trichlorotrifluoroethane and then dried at about 40° C. for 1 hour. For preparing other alkaline earth metal salts of the surfactant, the trichlorotrifluoroethane is removed and water containing lithium hydroxide is added to neutralize the acid and the surfactant is used as an aqueous solution.

This invention is now illustrated, using the procedure described above, by the following specific examples of certain representative embodiments thereof, where all parts, proportions and percentages are by weight unless otherwise indicated.

All the polymerizations are carried out in a 2-liter single continuously stirred-tank reactor (autoclave) in a continuous manner.

TABLE 1

| | EXAMPLES 1-2 AND COMPARATIVE EXAMPLES 3-5 | |
|---|---|---|
| TYPES OF SURFACTANT | (1)<br>$F\text{-}(CF_2CF_2)_{\overline{n}}CH_2CH_2OSO_3Li$ | (2)<br>$F\text{-}(CF_2CF_2)_{\overline{n}}CH_2CH_2OSO_3Li$ |
| Monomer Feed | | |
| VF$_2$ g/hr | 1710   (59 wt. %) | 1710 |
| HFP g/hr | 1190 | 1190 |
| Water Solution A Pump | | |
| (NH$_4$)$_2$S$_2$O$_8$ g/hr (Initiator) | 8.75 | 8.75 |
| Na$_2$HPO$_4$7H$_2$O g/hr (Buffer) | 3.75 | — |
| NaOH g/hr (Buffer) | — | 0.72 |
| Water liter/hr | 4.0 | 4.0 |
| Water Solution B Pump | | |
| Surfactant g/hr | 25.0 | 18.75 |
| Chain Transfer Agents<br>Isopropyl alcohol g/hr (mol/hr)<br>Conc. 1.55 × 10$^{-3}$ mole/100 g monomer | 2.7   (.045) | — |
| Diethyl malonate g/hr (mol/hr) | — | 7.25   (0.0453) |
| Water liter/hr | 4.0 | 4.0 |
| Reactor Temp °C. | 115 | 115 |
| Reactor Pressure MPa | 6.2 | 6.2 |
| % Conversion of Monomer | 98.2 | 96.8 |

TABLE 1-continued

| Composition of Polymers | | |
|---|---|---|
| Wt. % HFP | 39.8 | 41 |
| Mooney Viscosity | 44 | 67 |
| Inherent Viscosity at 30° C. | 0.68 | |
| Rate of Production g/liter/hr | 1424 | |
| Average diameter of Polymer Particles μm | 0.25 | 0.22 |
| pH of latex | 3.1 | 2.6 |
| Molecular Weight Distribution | | |
| $\overline{M}w \times 10^{-3}$ | 236 | 316 |
| $\overline{M}n \times 10^{-3}$ | 85 | 104 |
| $\overline{M}w/\overline{M}n$ | 2.8 | 3.04 |
| Acid end group conc. meg/kg of Polymer | 2.31 | 3.89 |

SUMMARY OF RESULTS

| | EXAMPLES | COMPARATIVE EXAMPLES | |
|---|---|---|---|
| | (3) | (4) | (5) |
| TYPE OF SURFACTANT | $CF_3(CF_2)_6SO_3Li$ | $F(CF_2CF_2)_nCH_2CH_2-P-(O)(ONa)_3$ | NONE |
| Monomer Feed | | | |
| VF$_2$ g/hr | 1380 | 1700 | 1710 |
| HFP g/hr | 1120 | 1200 | 1190 |
| Water Solution A Pump | | | |
| (NH$_4$)$_2$S$_2$O$_8$ g/hr (Initiator) | 9.27 | 8:75 | 9.9 |
| NaOH g/hr (Buffer) | 1.5 | 0.72 | 1.5 |
| Water liter/hr | 4.0 | 4.0 | 4.0 |
| Water Solution B Pump | | | |
| Surfactant g/hr | 18.75 | 49.19 | — |
| Chain Transfer Agents | | | |
| Isopropyl alcohol g/hr (mol/hr) | — | — | — |
| Diethyl malonate g/hr (mol/hr) | 14.0 (0.0875) | 7.25 (0.0453) | 17.69 (0.111) |
| Water liter/hr | 4.0 | 4.0 | 4.0 |
| Reactor Temp °C. | 115 | 115 | 115 |
| Reactor Pressure MPa | 6.2 | 6.2 | 6.2 |
| % Conversion of Monomer | 94.2 | 97.4 | 91.1 |
| Composition of Polymers | | | |
| Wt. % HFP | 39 | 40.0 | 40.0 |
| Mooney Viscosity | 52 | 64 | 52 |
| Inherent Viscosity at 30° C. | 0.64 | 0.74 | 0.70 |
| Rate of Production g/liter/hr | 1151.0 | 1378 | 1321 |
| Average diameter of Polymer Particles μm | — | 0.27 | 0.75 |
| Molecular Weight Distribution | | | |
| $\overline{M}n \times 10^{-3}$ | — | 317 | 236 |
| $\overline{M}n \times 10^{-3}$ | — | 99 | 98 |
| $\overline{M}w/\overline{M}n$ | — | 3.19 | 2.4 |
| Acid end group conc. meg/kg of Polymer | 2.35 | 3.69 | 3.7 |
| pH of latex | 2.5 | 4.4 | 2.3 |

The following recipe was used in preparing the vulcanizates of the fluoroelastomers of Example 1-2 and Comparative Examples 3-5.

| | Parts by Weight |
|---|---|
| Polymer | 100 |
| Carbon Black (M.T.) | 30 |
| Magnesium Oxide | 3 |
| Calcium hydroxide | 6 |
| Benzyl triphenyl phosponium chloride | 0.55 |
| 4,4'-[2,2,2-trifluoro-1-(trifluoromethyl)]ethylidene bisphenol | 2.0 |

Curing: Press cure 10 minutes at 177° C. and then postcure at 232° C. for 24 hours.

The following data compare the properties of vulcanizates of the fluoroelastomers of Example 1 and 2 and Comparative Examples 3-5, which properties were determined according to ASTM D412 and D395 methods.

| | Example | | Comparative Examples | | |
|---|---|---|---|---|---|
| | 1 | 2 | 3 | 4 | 5 |
| M$_{100}$, MPa | 5.0 | 5.5 | 6.2 | 6.2 | 5.3 |
| T$_B$, MPa | 13.0 | 12.1 | 11.03 | 10.0 | 12.8 |
| E$_B$ % | 190 | 195 | 200.0 | 190 | 185 |

(M is modulus, T$_B$ is tensile at break, E$_B$ is elongation at break)

| Compression Set: | | | | | |
|---|---|---|---|---|---|
| 70 h/204° C. | 20 | 21.4 | 25.0 | 29 | 17 |
| 70 h/232° C. | 47 | 42.9 | 48.8 | 54.3 | 44 |

The processing characteristics of Example 2 and Comparative Example 5 were carried out using the Monosanto Processability Tester (MPT). Comparative Examples 3 and 4 were not included in the test because they showed cure retardation. The results of MPT are tabulated on the following page.

employed therein a high production rate, i.e., rate of polymerization per unit volume of reactor (monomer feed and conversion) is achieved without loss of raw polymer properties, i.e., low acid end groups and processing characteristics. The experimental conditions, monomer conversion and raw polymer properties are given in Table 2.

Monsanto Processability Tester (MPT) Evaluation of Polymer with Control Polymers The die swell measurements on these polymers were determined by using the "Monsanto Processability Tester" which is equipped with constant rate capillary rheometer with laser die swell and stress relaxation measurements' capability. The conditions for running the test are given below.
MPT; 105° C.; .0591 inches (0.15 cm) Die, L/D = 20, 6 minutes Warmup, 04 Mode

| Shear Rate (Sec$^{-1}$) | 7 | 15 | 36 | 73 | 145 | 373 | 727 |
|---|---|---|---|---|---|---|---|
| Example 1 | | | | | | | |
| Apparent melt Viscosity (Pa-sec) | $4.3 \times 10^4$ | $2.5 \times 10^4$ | $1.2 \times 10^4$ | $6.8 \times 10^3$ | $3.6 \times 10^3$ | $1.5 \times 10^3$ | $6.8 \times 10^3$ |
| Actual Swell Index | 1.19 | 1.20 | 1.20 | 1.20 | 1.18 | 1.17 | 1.16 |
| Die Swell Variation | 0 | 0 | 0 | 0 | 0 | 0 | 0 |
| Comparative Example 5 | | | | | | | |
| Apparent melt Viscosity (Pa-sec) | $4.6 \times 10^4$ | $2.7 \times 10^4$ | $1.2 \times 10^4$ | $6.2 \times 10^3$ | $1.4 \times 10^3$ | $1.4 \times 10^3$ | $8.0 \times 10^2$ |
| Actual Swell Index | 1.24 | 1.31 | 1.28 | 1.21 | 1.19 | 1.14 | 1.14 |
| Die Swell Variation | ±7% | ±5% | ±3% | ±1% | ±1% | 0 | 0 |

EXAMPLES 6-8 AND COMPARATIVE EXAMPLES 9-11

A vinylidene fluoride and hexafluoropropene copolymer is prepared by a continuous process in the manner described above in Example 1 in the presence and absence of surfactants with different chain transfer agents. It is evident from Example 8 that with the surfactant

2

| | EXAMPLES | | | COMPARATIVE EXAMPLES | | |
|---|---|---|---|---|---|---|
| | 6 | 7 | 8 | 9 | 10 | 11 |
| TYPE OF SURFACTANT | F$-$(CF$_2$CF$_2$)$_{\overline{n}}$CH$_2$CH$_2$OSO$_3$NH$_4$ | | | — | F$-$(CF$_2$CF$_2$)$_{\overline{n}}$CH$_2$CH$_2$P(O)(ONa)$_3$ | — |
| Monomer Feed | | | | | | |
| VF$_2$ g/hr | 1828 | 1828 | 2950 | 1742 | 1752 | 1754 |
| HFP g/hr | 1272 | 1272 | 2050 | 1348 | 1388 | 1376 |
| Water Solution A Pump | | | | | | |
| (NH$_4$)$_2$S$_2$O$_8$ g/hr (Initiator) | 7.25 | 7.25 | 10 | 9.9 | 9.9 | 9.9 |
| Na$_2$HPO$_4$7H$_2$O g/hr (Buffer) | 3.75 | 3.75 | 6.0 | — | — | — |
| NaOH g/hr (Buffer) | — | — | — | 1.5 | 1.5 | 1.5 |
| Water liter/hr | 4 | 4 | 4 | 4.6 | 4.6 | 4.6 |
| Water Solution B Pump | | | | | | |
| Surfactant g/hr | 18.8 | 18.8 | 26.0 | — | 8.6 | — |
| Chain Transfer Agents | | | | | | |
| Diethylmalonate g/hr (mol/hr) | 7.3 (0.0453) | — | — | 14.7 (0.0921) | 14.7 (0.0921) | — |
| Isopropyl alcohol g/hr (mol/hr) | — | 2.7 (0.0453) | 4.24 (0.071) | — | — | 4.15 (0.069) |
| Water liter/hr | 4 | 4 | 4 | 4.6 | 4.6 | 4.6 |
| Reactor Temp °C. | 115 | 115 | 115 | 110 | 110 | 110 |
| Reactor Pressure MPa | 6.2 | 6.2 | 6.2 | 6.2 | 6.2 | 6.2 |
| % Solids | 27.6 | 27.9 | 38.6 | 23.4 | 24.0 | 23.6 |
| % Conversion of Monomers (Calculated) | 97.4 | 98.2 | 93.3 | 90.1 | 91.7 | 90.5 |
| Composition of Polymer | | | | | | |
| Wt. % HFP | 39.9 | 39.4 | 38.1 | 39.4 | 40.6 | 40.0 |
| ML-10 at 100° C. | 64 | 55 | 55 | 60 | 54 | 53 |
| Inherent Viscosity at 30° C. | 0.86 | 0.77 | 0.79 | 0.79 | 0.70 | 0.71 |
| Average diameter of Polymer Particles μm | 0.37 | 0.39 | 0.51 | 0.72 | 0.46 | 0.80 |
| Rate of Production g/liters/hr | 1590 | 1610 | 2460 | 1330 | 1372 | 1350 |
| Acid end group Conc. meg. per kg of Polymer | 2.07 | 1.66 | 1.06 | 3.0 | 4.0 | 2.5 |
| $\overline{M}_n \times 10^{-3}$ | 93 | 70 | — | 225 | 225 | 234 |
| $\overline{M}_n \times 10^{-3}$ | 318 | 235 | — | 96 | 91 | 97 |
| $\overline{M}_w/\overline{M}_n$ | 3.42 | 3.34 | — | 2.34 | 2.47 | 2.41 |
| pH of Latex | 3.2 | 2.9 | 3.3 | 2.6 | 2.5 | 2.4 |
| Compression Set | 14.7 | 14.7 | 14.7 | 16 | 18 | 12 |
| Swell Index | 40 | 45 | 46 | 102 | 107 | 102 |

PROCESSING TEST AT 60° C.

Measurements obtained from capillary rheometer (Montsanto Processability Tester) with round die of I.D.=0.0591 inches (0.15 cm) and L/D=1 at 60° C.

| Apparent Shear Rate (Sec$^{-1}$) | Measurement$^c$ | Examples | | | Comparative Examples | | |
|---|---|---|---|---|---|---|---|
| | | 6 | 7 | 8 | 9 | 10 | 11 |
| 7.27 | Pressure | 1236 | 1220 | 1920 | 1250 | 1220 | 1120 |
| | Die Swell | 29 | 27 | 50 | 65 | 74 | 70 |
| 36.3 | Pressure | 1884 | 1806 | 3667 | 1920 | 1890 | 1690 |
| | Die Swell | 38 | 37 | 48 | 97 | 112 | 93 |
| 182 | Pressure | 7943 | 4318 | 9496 | 5820 | 4850 | 3690 |
| | Die Swell | 72 | 69 | 89 | 259 | 253 | 222 |
| 363 | Pressure | 10572 | 9398 | 12793 | 9480 | 9070 | 7970 |
| | Die Swell | 72 | 79 | 83 | — | — | 279 |
| 727 | Pressure | 12420 | 11896 | 14865 | 11820 | 11610 | 10800 |
| | Die Swell | 89 | 88 | 86 | Cannot be Measured. | | |
| Stress-Strain Properties: | | | | | | | |
| 100% Modulus, MPa | | 5.1 | 4.8 | 4.8 | 5.0 | 4.7 | 4.9 |
| Tensile Strength, MPa | | 14.34 | 12.96 | 14.2 | 11.9 | 10.8 | 12.1 |
| Elongation, % | | 210 | 225 | 230 | 205 | 215 | 205 |
| Compression Set, Method B (O-Rings): | | | | | | | |
| 200° C./70 hr. % | | 14.7 | 14.7 | 14.7 | 16 | 18 | 12 |
| 232° C./70 hr. % | | 35 | 35 | 35 | 35 | 41 | 35 |

Basic Recipe:
Recipe used in preparing the vulcanizates of the polymers of Examples 6–8 and Comparative Examples 9–11 is the same as that given in Examples 1–5 above.

PROCESSING TEST AT 100° C.

Measurements obtained from capillary rheometer (Montsanto Processability Tester) with round die of I.D.=0.0591 inches (0.15 cm) and L/D=1 at 100° C.

| Apparent Shear Rate (Sec$^{-1}$) | Measurement$^c$ | Examples | | | Comparative Examples | | |
|---|---|---|---|---|---|---|---|
| | | 6 | 7 | 8 | 9 | 10 | 11 |
| 7.27 | Pressure | 632 | 499 | 1210 | 630 | 610 | 450 |
| | Swell | 40 | 45 | 46 | 102 | 107 | 102 |
| 36.3 | Pressure | 963 | 876 | 1635 | 1010 | 960 | 830 |
| | Swell | 31 | 40 | 43 | 88 | 97 | 93 |
| 182 | Pressure | 1405 | 1331 | 2294 | 1430 | 1420 | 1290 |
| | Swell | 29 | 31 | 46 | 74 | 83 | 74 |
| 363 | Pressure | 1665 | 1559 | 2728 | 1680 | 1660 | 1540 |
| | Swell | 32 | 33 | 47 | 88 | 93 | 79 |
| 727 | Pressure | 1971 | 1882 | 3296 | 2000 | 1980 | 1820 |
| | Swell | 39 | 40 | 51 | 117 | 127 | 107 |

In Comparative Example 10 the level of the surfactant agent was reduced from 49 g/h to 8.55 g/h, as it was employed in Comparative Example 4 to correct the retardation of cure which was evident from the compression set data. However, even at this level of surfactant, the compression set is higher than Example 7. The processing characteristic of Examples 6, 7 and 8 are seen to be superior to those of Comparative Examples 9, 10 and 11. Thus the best balanced properties are obtained by using F—CF$_2$CF$_2$—CH$_2$CH$_2$OSO$_3$M and isopropanol alcohol, which shows the lowest amount of strong acid end group concentration.

I claim:

1. A process for making a fluoroelastomer which comprises feeding to an aqueous polymerization medium in a reactor about 25–75% by weight of the total monomers, vinylidene fluoride, at least one other fluorine-containing ethylenically unsaturated monomer containing at least as many fluorine atoms as carbon atoms and copolymerizable with vinylidene fluoride, an inorganic free-radical initiator, a chain transfer agent added in an amount sufficient to maintain a concentration in the aqueous polymerization medium of from about $0.5 \times 10^{-3}$ to $5 \times 10^{-3}$ moles per 100 grams of total monomers, and from about 0.02–2% by weight, based on the weight of the aqueous medium, of a surfactant which is a compound having the formula:

$$F-CF_2CF_2-_nCH_2CH_2-OSO_3M$$

where n is an integer of from 2–8 or mixtures thereof and M is an alkali metal cation, hydrogen or ammonium, maintaining the pH of the aqueous polymerization medium within a range of from about 2.5–5, continuously removing a portion of the resulting fluoroelastomer latex from the polymerization reactor and adding to said portion a mineral acid or a carboxylic acid containing no more than 5 carbon atoms and having a pK of less than about 4.2 to lower the pH to about 2 or below and a water-soluble salt of an alkaline earth metal to coagulate the fluoroelastomer and recovering the fluoroelastomer from the latex.

2. A process of claim 1 wherein a mineral acid is added to the fluoroelastomer latex.

3. A process of claim 2 wherein the mineral acid is nitric acid.

4. A process of claim 2 wherein the water-soluble salt of the alkaline earth metal is calcium nitrate.

5. A process of claim 2 wherein the mineral acid is added to the fluoroelastomer latex prior to the addition of the alkaline earth metal salt.

6. A process of claim 2 wherein M is sodium, lithium or ammonium.

7. A process of claim 2 wherein the chain transfer agent is isopropanol.

8. A process of claim 2 wherein the chain transfer agent is diethyl malonate.

9. A process of claim 2 wherein the mineral acid is nitric acid and the alkaline earth metal salt is calcium nitrate.

10. A process of claim 2 wherein M is ammonium.

11. A process of claim 2 wherein sodium hydroxide is added to the aqueous polymerization medium to maintain the pH between 2.5–5.

12. A process of claim 2 wherein the fluorine-containing ethylenically unsaturated monomer is hexafluoropropene.

* * * * *